(12) United States Patent
Shalev (10) Patent No.: US 9,208,086 B1
(45) Date of Patent: Dec. 8, 2015

(54) USING FREQUENCY DOMAIN TO PRIORITIZE STORAGE OF METADATA IN A CACHE

(71) Applicant: PURE Storage, Inc., Mountain View, CA (US)

(72) Inventor: Ori Shalev, Cupertino, CA (US)

(73) Assignee: Pure Storage, Inc., Mountain View, CA (US)

( * ) Notice: Subject to any disclaimer, the term of this patent is extended or adjusted under 35 U.S.C. 154(b) by 148 days.

(21) Appl. No.: 14/151,257

(22) Filed: Jan. 9, 2014

(51) Int. Cl.
  *G06F 12/08* (2006.01)
  *G06F 12/12* (2006.01)

(52) U.S. Cl.
  CPC ........ *G06F 12/0802* (2013.01); *G06F 12/0848* (2013.01); *G06F 12/122* (2013.01); *G06F 12/127* (2013.01)

(58) Field of Classification Search
  CPC ...... G06F 12/122; G06F 12/127; G06F 12/08
  USPC ......................... 711/129, 136, 118
  See application file for complete search history.

(56) References Cited

U.S. PATENT DOCUMENTS

| | | | | |
|---|---|---|---|---|
| 5,954,820 | A * | 9/1999 | Hetzler | 713/323 |
| 2009/0248863 | A1* | 10/2009 | Uyama et al. | 709/224 |
| 2009/0300280 | A1* | 12/2009 | Jutzi et al. | 711/113 |
| 2012/0137075 | A1* | 5/2012 | Vorbach | 711/122 |
| 2014/0297989 | A1* | 10/2014 | Honjo et al. | 711/171 |
| 2015/0088805 | A1* | 3/2015 | Kakarla et al. | 707/600 |

* cited by examiner

*Primary Examiner* — Than Nguyen
(74) *Attorney, Agent, or Firm* — Edward J. Lenart; Kennedy Lenart Spaggins LLP (57) ABSTRACT

A system and method for efficiently caching metadata in a storage system. Addresses from a plurality of I/O accesses to the storage system are captured and then a frequency domain representation of the addresses is generated. The frequency domain representation is used to measure the randomness of the various applications which are accessing the storage system. Scores are generated based on the measure of randomness, and scores are assigned to the various regions of the logical address space. Scores are then assigned to the metadata pages which are stored in the cache based on the region of the logical address space to which the metadata pages correspond. The scores are used when determining which metadata pages to evict from the cache. The cache will attempt to evict those metadata pages which correspond to regions of the logical address space that are servicing random I/O accesses.

20 Claims, 9 Drawing Sheets

| Access Number | Logical Address |
|---|---|
| 1 | A1 |
| 2 | A2 |
| 3 | A3 |
| ⋮ | ⋮ |
| N | AN |

Listing 400

$$[A1\ A2\ A3\ A4\ A5\ A6\ A7\ A8] * \begin{bmatrix} 0.3536 & 0.4904 & 0.4619 & 0.4157 & 0.3536 & 0.2778 & 0.1913 & 0.0975 \\ 0.3536 & 0.4157 & 0.1913 & -0.0975 & -0.3536 & -0.4904 & -0.4619 & -0.2778 \\ 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4904 \\ 0.3536 & -0.0975 & -0.4619 & 0.2778 & 0.3536 & -0.4157 & -0.1913 & 0.4904 \\ 0.3536 & -0.2778 & -0.1913 & 0.4904 & -0.3536 & -0.0975 & 0.4619 & -0.4157 \\ 0.3536 & -0.4157 & 0.1913 & 0.0975 & -0.3536 & 0.4904 & -0.4619 & 0.2778 \\ 0.3536 & -0.4904 & 0.4619 & -0.4157 & 0.3536 & -0.2778 & 0.1913 & -0.0975 \end{bmatrix} = [F1\ F2\ F3\ F4\ F5\ F6\ F7\ F8]$$

USING FREQUENCY DOMAIN TO PRIORITIZE STORAGE OF METADATA IN A CACHE

BACKGROUND

1. Field of the Invention

This invention relates to a storage system, and more particularly to caching metadata in a storage system.

2. Description of the Related Art

Storage systems often store large amounts of data and process a variety of different workloads from various numbers of clients. These storage systems typically have non-volatile storage devices which are used to store client data, and volatile memory to cache metadata used for locating the client data. As the amount of data increases, so does the amount of metadata, and determining which metadata to store in the cache(s) becomes more challenging.

Software applications, such as a logical volume manager or a disk array manager, provide a means of allocating space in storage systems. In addition, a system administrator can create units of storage groups including logical volumes. Storage virtualization provides an abstraction of logical storage from physical storage in order to access logical storage without end-users identifying physical storage. The logical storage may be accessed via a logical address space, with a volume and block number of a given request being used to generate an address within the logical address space.

To support storage virtualization, a volume manager performs input/output (I/O) redirection by translating incoming I/O requests using logical addresses from end-users into new requests using addresses associated with physical locations in the storage devices. As some storage devices include additional address translation mechanisms, such as address translation layers which may be used in solid state storage devices, the translation from a logical address to another address may not be the only or final address translation. Redirection utilizes metadata stored in one or more mapping tables. In addition, information stored in the one or more mapping tables may be used for storage deduplication For example, in one embodiment, a data storage subsystem may be coupled to a network, and the data storage subsystem may receive read and write requests via the network from one or more client computers. The data storage subsystem may include a plurality of data storage locations on a device group including a plurality of storage devices. The data storage subsystem may also include one or more mapping tables storing a plurality of entries for translating logical addresses of received requests to physical addresses corresponding to data storage locations. Rather than storing the entirety of the mapping table(s) in the device group, portions of the mapping table may be stored in a cache for faster access, allowing some lookups to be performed more efficiently with fewer accesses to the storage devices. The mapping table(s) may be organized into pages, with each page storing a plurality of entries. Portions of the mapping table may be added and evicted from the cache in page size allocation units. In other embodiments, other allocation unit sizes may be chosen.

A typical storage system may process a variety of different types of data workloads. Some of the workloads may have random access patterns while other workloads may have more predictable access patterns. As metadata from these various workloads competes for cache space, it is challenging for the storage system to come up with efficient schemes for choosing which metadata to retain in the cache.

SUMMARY OF THE INVENTION

Various embodiments of systems and methods for caching metadata in a storage system are contemplated.

In one embodiment, the storage system may include a storage controller, a cache, and a plurality of storage devices. The storage controller may be configured to analyze the workloads that are being processed. In one embodiment, the storage controller may determine which workloads have random access patterns and which workloads have predictable access patterns. Also, the storage controller may identify metadata which corresponds to the workloads with random access patterns and identify which metadata corresponds to the workloads with predictable access patterns. The metadata associated with the random workloads may be evicted from the cache while the metadata associated with the predictable workloads may be retained in the cache.

In one embodiment, a plurality of addresses corresponding to a plurality of input/output (I/O) accesses to the storage system may be captured, with the plurality of addresses targeting the logical address space of the storage system. The logical address space may be partitioned into a plurality of regions, and the plurality of addresses may be sorted into a plurality of lists, with one list for each region of the logical address space.

For each list of captured addresses, the list may be transformed into a frequency domain representation to allow for spectral analysis of the frequency components of the access pattern to the corresponding region. In one embodiment, a Fourier-related transform may be utilized to generate the frequency domain representation of each list. In one embodiment, a score may be generated for each region based on the analysis of the corresponding frequency domain representation. A cache replacement algorithm may utilize the generated scores to determine which pages in the cache to replace when new metadata needs to be loaded into the cache. The cache replacement algorithm may attempt to prevent metadata for workloads with random access patterns from kicking out metadata for workloads that have predictable access patterns.

In one embodiment, if a given frequency domain representation indicates the access pattern is a highly random access pattern, then a low score may be given to the corresponding region. Any metadata pages containing address translations for this region may be assigned this low score when these metadata pages are stored in the cache. If a given frequency domain representation indicates the access pattern is a low random access pattern, then a high score may be given to the corresponding region. This high score may be assigned to any metadata pages which have address translations for this region and which are stored in the cache. The cache may retain metadata pages with high scores while evicting metadata pages with low scores.

Low random access patterns tend to correspond to accesses that will retarget the same region of the logical address space for future accesses. Accordingly, metadata pages corresponding to regions with low random access patterns are likely to be reused and the cache may attempt to retain metadata pages with high scores in the cache. Highly random access patterns tend to correspond to accesses that will not come back to the same region of the logical address space for future accesses. Therefore, metadata pages corresponding to regions with high random access patterns are not likely to be reused and the cache may attempt to evict metadata pages with low scores from the cache. In this way, the efficiency of the storage system will be improved by retaining metadata pages in the cache which are likely to be used again, resulting in fewer lookups to the storage devices for metadata.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the various embodiments might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . ." Such a claim does not foreclose the system from including additional components (e.g., network interface, display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, the terms "first" and "second" regions of a logical address space can be used to refer to any two regions.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
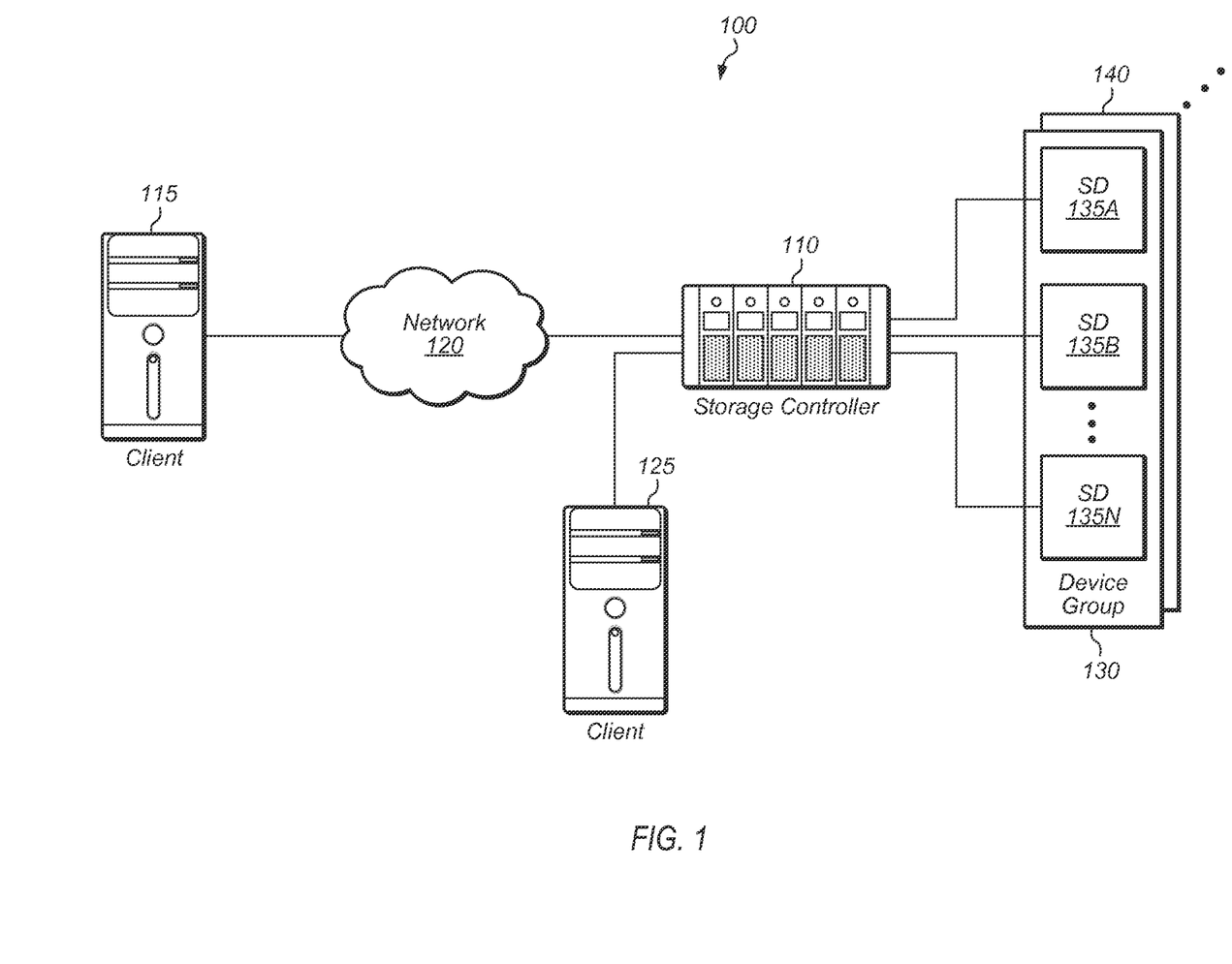
FIG. 1 is a generalized block diagram illustrating one embodiment of a storage system.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may run any type of OS (e.g., Windows®, Unix®, Linux®, Solaris®, MacOS®) depending on the embodiment.

It is noted that in alternative embodiments, the number and type of clients, storage controllers, networks, storage device groups, and data storage devices is not limited to those shown in FIG. 1. Furthermore, in various embodiments, the methods and mechanisms disclosed herein can be implemented in various networks and systems including computer systems, security systems, wireless networks, network architectures, data centers, operating systems, communication devices, and various other devices and systems.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number and type of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
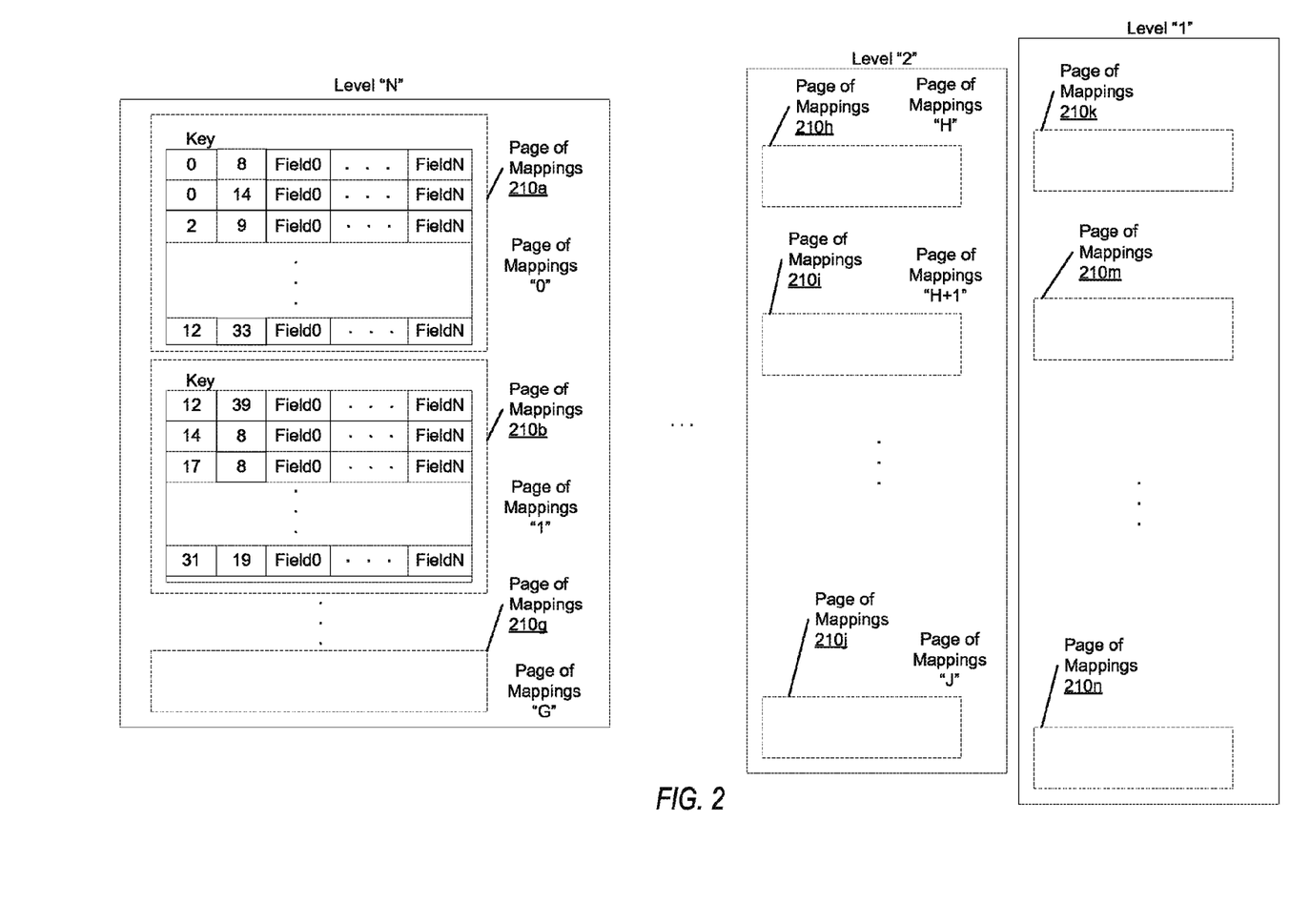
FIG. 2 is a block diagram illustrating one embodiment of a mapping table.

Turning now to FIG. 2, a generalized block diagram of one embodiment of a mapping table is shown. One or more mapping tables may be used for I/O redirection or translation, deduplication of duplicate copies of user data, snapshot mappings, and so forth. Mapping tables may be stored in the storage devices 135A-N (of FIG. 1). The diagram shown in FIG. 2 represents a logical representation of one embodiment of the organization and storage of the mapping table. Each level shown may include mapping table entries corresponding to a different period of time. For example, level "1" may include information older than information stored in level "2". Similarly, level "2" may include information older than information stored in level "3". The information stored in the records, pages and levels shown in FIG. 2 may be stored in a random-access manner within the storage devices 135A-N. Additionally, copies of portions or all of a given mapping table entries may be stored in a random-access memory (RAM), in buffers within a storage controller, and/or in one or more caches for faster access. In various embodiments, a corresponding index may be included in each level for mappings which are part of the level. Such an index may include an identification of mapping table entries and where they are stored (e.g., an identification of the page) within the level. In other embodiments, the index associated with mapping table entries may be a distinct entity, or entities, which are not logically part of the levels themselves.

Generally speaking, each mapping table comprises a set of rows and columns. A single record may be stored in a mapping table as a row. A record may also be referred to as an entry. In one embodiment, a record stores at least one tuple including a key. Tuples may (or may not) also include data fields including data such as a pointer used to identify or locate data components stored in the storage subsystem. It is noted that in various embodiments, the storage subsystem may include storage devices (e.g., SSDs) which have internal mapping mechanisms. In such embodiments, the pointer in the tuple may not be an actual physical address per se. Rather, the pointer may be a logical address which the storage device maps to a physical location within the device.

Over time, this internal mapping between logical address and physical location may change. In other embodiments, records in the mapping table may only contain key fields with no additional associated data fields. Attributes associated with a data component corresponding to a given record may be stored in columns, or fields, in the table. Status information, such as a valid indicator, a data age, a data size, and so forth, may be stored in fields, such as Field0 to FieldN shown in FIG. 2.

A key is an entity in a mapping table that may distinguish one row of data from another row. Each row may also be referred to as an entry or a record. A key may be a single column, or it may consist of a group of columns used to identify a record. In one example, an address translation mapping table may utilize a key comprising a volume identifier (ID), a logical or virtual address, a snapshot ID, a sector number, and so forth. A given received read/write storage access request may identify a particular volume, sector and length. A sector may be a logical block of data stored in a volume. Sectors may have different sizes on different volumes. The address translation mapping table may map a volume in sector-size units.

In one embodiment, a volume identifier (ID) along with a received sector number may be used to access the address translation mapping table. Therefore, in such an embodiment, the key value for accessing the address translation mapping table is the combination of the volume ID and the received sector number. In other embodiments, other values may be used to generate a key value. In one embodiment, the records within the address translation mapping table are sorted by key value.

The address translation mapping table may convey a physical pointer value that indicates a location within the data storage subsystem 170 storing a data component corresponding to the received data storage access request. The key value may be compared to one or more key values stored in the mapping table. In the illustrated example, simpler key values, such as "0", "2", "12" and so forth, are shown for ease of illustration. The physical pointer value may be stored in one or more of the fields in a corresponding record.

The physical pointer value may include a segment identifier (ID) and a physical address identifying the location of storage. A segment may be a basic unit of allocation in each of the storage devices 135A-N. A segment may have a redundant array of independent device (RAID) level and a data type. During allocation, a segment may have one or more of the storage devices 135A-N selected for corresponding storage. In one embodiment, a segment may be allocated an equal amount of storage space on each of the one or more selected storage devices of the storage devices 135A-N.

In another example, the mapping table shown in FIG. 2 may be a deduplication table. A deduplication table may utilize a key comprising a hash value determined from a data component associated with a storage access request. The initial steps of a deduplication operation may be performed concurrently with other operations, such as a read/write request, a garbage collection operation, a trim operation, and so forth. For a given write request, the data sent from one of the client computer systems may be a data stream, such as a byte stream. A chunking algorithm may perform the dividing of the data stream into discrete data components which may be referred to as "chunks". A chunk may be a sub-file content-addressable unit of data. The resulting chunks may then be stored in one of the data storage arrays 120a-120b to allow for sharing of the chunks. Such chunks may be stored separately or grouped together in various ways.

In various embodiments, the chunks may be represented by a data structure that allows reconstruction of a larger data component from its chunks (e.g. a particular file may be reconstructed based on one or more smaller chunks of stored data). A corresponding data structure may record its corresponding chunks including an associated calculated hash value, a pointer (physical and/or logical) to its location in a storage device 135A-N, and its length.

A mapping table may comprise one or more levels as shown in FIG. 2. A mapping table may comprise 16 to 64 levels, although mapping tables with other numbers of levels are possible and contemplated. In FIG. 2, three levels labeled Level "1", Level "2" and Level "N" are shown for ease of illustration. Each level within a mapping table may include one or more partitions. In one embodiment, multiple levels within a mapping table are sorted by time. For example, in FIG. 2, Level "1" may be older than Level "2". Similarly, Level "2" may be older than Level "N".

In one embodiment, each partition is a 4 kilo-byte (KB) page. For example, Level "N" is shown to comprise pages 210a-210g, Level "2" comprises pages 210h-210j and Level "1" comprises pages 210k-210n. It is possible and contemplated other partition sizes may also be chosen for each of the levels within a mapping table. In addition, it is possible one or more levels have a single partition, which is the level itself.

Figure 3:
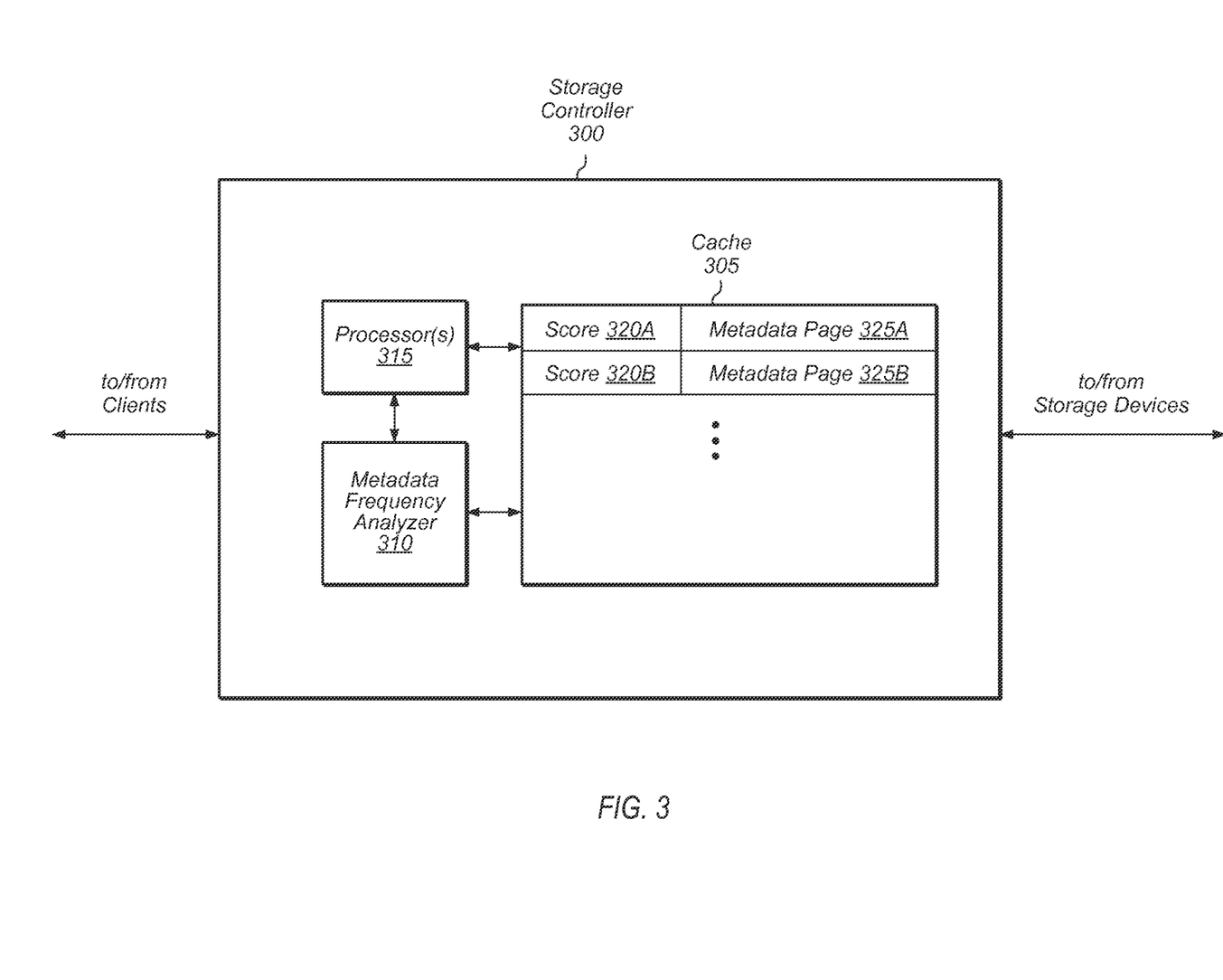
FIG. 3 illustrates one embodiment of a storage controller.

Turning now to FIG. 3, a block diagram of one embodiment of a storage controller 300 is shown. Storage controller 300 may include cache 305, metadata frequency analyzer 310, and processor(s) 315. Metadata frequency analyzer 310 may be implemented using any combination of hardware and/or software. It is noted that while metadata frequency analyzer 310 is shown separately from processor(s) 315, portions or the entirety of metadata frequency analyzer 310 may be executed by processor(s) 315. It is noted that storage controller 300 may also include other logic and components (e.g., network interface, RAM) which are not shown in FIG. 3 for ease of illustration. Storage controller 300 may also be coupled to one or more clients (not shown) and one or more storage devices (not shown).

Storage controller 300 may be configured to receive I/O requests targeting one or more storage devices of a storage system. Storage controller 300 may also be configured to process the received I/O requests by storing data at the targeted locations or retrieving data from the targeted locations. In order to locate the targeted locations, storage controller 300 may retrieve metadata corresponding to the logical addresses of the received I/O requests. In one embodiment, the metadata may include mapping table entries and/or index entries, with the mapping table entries including translations from the logical address space to the physical address space corresponding to the storage devices of the storage system.

Storage controller 300 may be configured to reduce the latency of I/O accesses targeting the one or more storage devices of a storage system. One approach for reducing latency is to cache metadata so as to decrease the number of times the external storage devices are accessed. Cache 305 may be configured to store metadata for the various applications being processed by the host storage system. In some embodiments, cache 305 may store both metadata and data. In other embodiments, cache 305 may store only metadata. Cache 305 may have any configuration (e.g., direct mapped or set associative).

While metadata is shown as being stored in cache 305 in page sized units (e.g., metadata page 325A-B), with each page including a plurality of translation entries, it is noted that this is merely for illustrative purposes. In other embodiments, other unit sizes of metadata may be stored in cache 305. For example, in another embodiment, individual translation entries may be allocated in cache 305. The allocation size of metadata stored in cache 305 may also be referred to more generally as a "metadata grain".

Metadata frequency analyzer 310 may be configured to perform a frequency analysis on the access patterns to the one or more storage devices of the storage system. Metadata frequency analyzer 310 may include any combination of hardware and/or software. In one embodiment, a plurality of received I/O accesses may be captured by storage controller 300 and provided as inputs to metadata frequency analyzer 310. More specifically, the logical addresses of the received I/O accesses may be captured and logged into one or more lists. In one embodiment, each logical address may consist of a volume ID and a logical block address (LBA). The one or more lists may then be transformed from the logical address space domain to the frequency domain. In one embodiment, the logical address space may be treated as though it were the time domain when using a Fourier-related transform to transform the addresses into the frequency domain. For example, each access may be considered to have been received a fixed amount of time subsequent to the previous access. In this embodiment, the actual time the access was made will not be captured, but only the order in which the accesses were made will be retained.

In one embodiment, metadata frequency analyzer 310 may receive as an input the address offsets of the I/O accesses in the logical address space. Then, metadata frequency analyzer 310 may convert these logical address offsets to the frequency domain. In one embodiment, metadata frequency analyzer 310 may use a Fourier transform, such as the discrete Fourier transform, to generate a frequency domain representation of the logical address offsets. In another embodiment, metadata frequency analyzer 310 may use a discrete cosine transform (DCT) to convert the addresses to the frequency domain. Using the DCT, metadata frequency analyzer 310 may convert the sequence of address values into a sum of cosine terms oscillating at different frequencies. In other embodiments, other types of transforms (e.g., wavelet) may be used to convert the address offsets to the frequency domain.

After the logical address space offsets are converted into the frequency domain, metadata frequency analyzer 310 may perform a spectral analysis of the generated frequency domain components. In one embodiment, if most of the energy in the frequency domain signal is located in the low frequency components, then metadata frequency analyzer 310 may identify these accesses as a predictable, low-random access pattern. If most of the energy in the frequency domain signal is located in the high frequency components, then metadata frequency analyzer 310 may identify these accesses as a highly-random access pattern.

In one embodiment, the logical address space may be partitioned into a plurality of regions. Metadata frequency analyzer 310 may utilize a scoring function formula to generate a score for the various regions of the logical address space. For example, if a first region which is servicing requests corresponds to a low-random access pattern as determined by the spectral analysis, then the first region may be given a high score. Any metadata pages which are stored in cache 305 and which correspond to the first region may be assigned the high score. If a second region corresponds to a highly random access pattern, then the second region may be given a low score. Any metadata pages which are stored in cache 305 and which correspond to the second region may be assigned the low score. As shown in FIG. 3, metadata pages 325A-B have been assigned scores 320A-B, which may correspond to the scores assigned to their corresponding regions in the logical address space.

When cache 305 needs to evict a metadata page, cache 305 may prioritize retaining metadata pages with a high score while attempting to evict metadata pages with a low score. It is noted that the assignment of scores may be reversed in other embodiments, such that highly random access pattern regions may be given a high score and low random access pattern regions may be given a low score. In these embodiments, cache 305 may prioritize retaining metadata pages with a low score while attempting to evict metadata pages with a high score. Any of various scoring functions may be utilized to generate a score for the various regions of the logical address space based on the corresponding frequency domain representations. For example, in one embodiment, an integral of the frequency domain representation may be calculated to generate a score for a given region.

Figure 4:
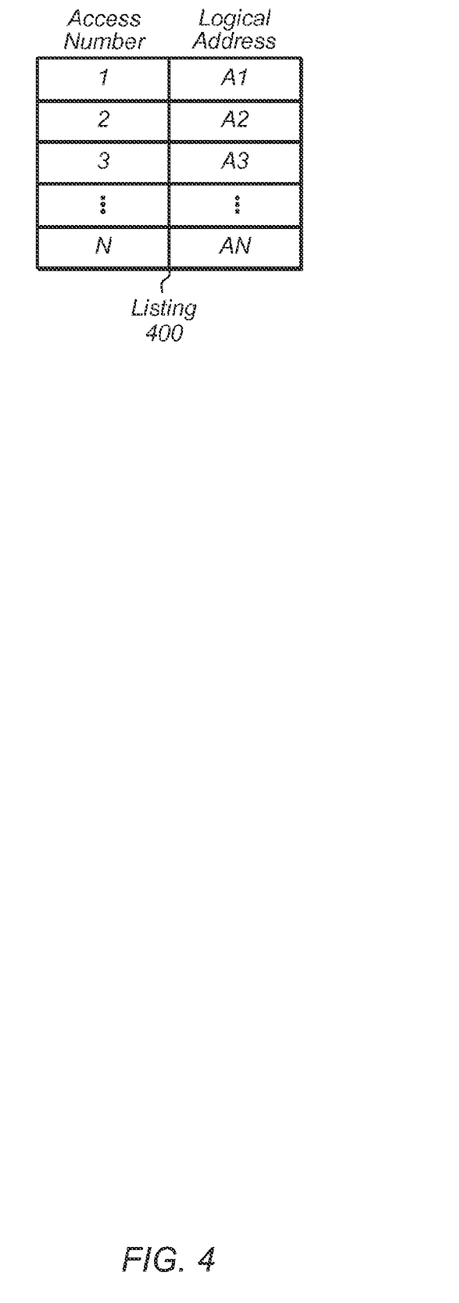
FIG. 4 illustrates one embodiment of a listing of captured I/O accesses.

Referring now to FIG. 4, one embodiment of a listing 400 of captured I/O accesses is shown. Listing 400 may include the most recently detected I/O accesses to the storage devices in a storage system (e.g., storage system 100 of FIG. 1). The time period over which listing 400 was captured may vary depending on the embodiment. Also, listing 400 includes a number of accesses 'N', wherein 'N' is representative of any number of accesses, depending on the embodiment.

In one embodiment, a storage controller may capture I/O accesses over a certain period of time. In another embodiment, the storage controller may start capturing I/O accesses and continue capturing I/O accesses until a certain threshold number of I/O accesses has been reached. The threshold number of accesses may vary depending on the embodiment.

As is shown in listing 400, each logical address of the access may be logged and stored in listing 400. These addresses are shown starting with A1, which is followed by A2, A3, and so on until AN, which represents the logical address of the last captured access. Listing 400 may be treated as though the access number were the x (or horizontal) axis and the logical address were the y (or vertical) axis. Listing 400 may then be converted into a frequency domain representation using any of various transforms (e.g., Discrete Fourier Transform (DFT), DCT, wavelet transform). In one embodiment, the conversion to the frequency domain representation may be performed by assuming the access number is a time measurement and by assuming the logical address is an amplitude. In other words, the columns of listing 400 may be treated as though they were time (or sample number) and amplitude rather than access number and logical address, respectively. Therefore, the conversion to the frequency domain representation is straightforward and may be performed using any of various techniques well known to those skilled in the art.

In some embodiments, listing 400 may be split up into multiple listings, and accesses may be categorized according to the region of the logical address space in which they are located. For example, if a logical address space is 4 gigabytes (GB) in size, then each 1 GB region of the logical address space may have its own listing. Any accesses that fall within the first GB of the logical address space may be stored in a first listing, accesses that fall within addresses 1 GB-2 GB may be stored in a second listing, and so on. In this way, a different frequency domain representation of each region may be generated and a score may be assigned to a metadata page based on the score of the region in which the metadata page is located.

In some embodiments, the regions may all be the same size, as in the example described above with 1 GB size regions. However, in other embodiments, the regions may be different sizes, with some regions larger than other regions. For example, in one embodiment, an address space may be split up into 10 regions, with 6 of the regions equal in size at 1 GB, while 2 of the regions are of size 500 megabytes (MB), and the remaining 2 regions are of size 250 MB.

In one embodiment, the logical address space may be partitioned into regions prior to capturing addresses of I/O accesses. In this embodiment, there may be a listing for each region of the logical address space, and the captured addresses may be stored in the listing corresponding to the region in which they are located. In another embodiment, the logical address space may be partitioned into regions after capturing addresses of I/O accesses. In this embodiment, the addresses may be analyzed prior to partitioning the logical address space into regions to determine how best to perform the partitioning. For example, if a large number of accesses are made to a particular area of the logical address space, then this area may be partitioned into smaller regions as compared to areas of the logical address space with small numbers of accesses. It is noted that other ways of partitioning the logical address space into regions are possible and are contemplated.

In one embodiment, once the regions have been defined, the captured addresses of I/O accesses may be assigned to their appropriate listings. Then, for each listing, the addresses in the logical address space may be converted into a frequency domain representation using any suitable transform (e.g., DFT, fast Fourier transform (FFT), DCT). A spectral analysis may be performed on each frequency domain representation so as to generate a score for the corresponding region in the logical address space. In one embodiment, if the frequency domain representation has mostly low frequency components, then a high score may be generated for the region. If the frequency domain representation has mostly high frequency components, then a low score may be generated for the region. Then, the metadata pages stored in the cache may be scored according to the score of the region to which they correspond. The cache may then utilize this score when determining which metadata pages to evict from the cache. The cache may attempt to evict metadata pages with a low score, corresponding to a region with mostly high frequency components.

Figure 5:
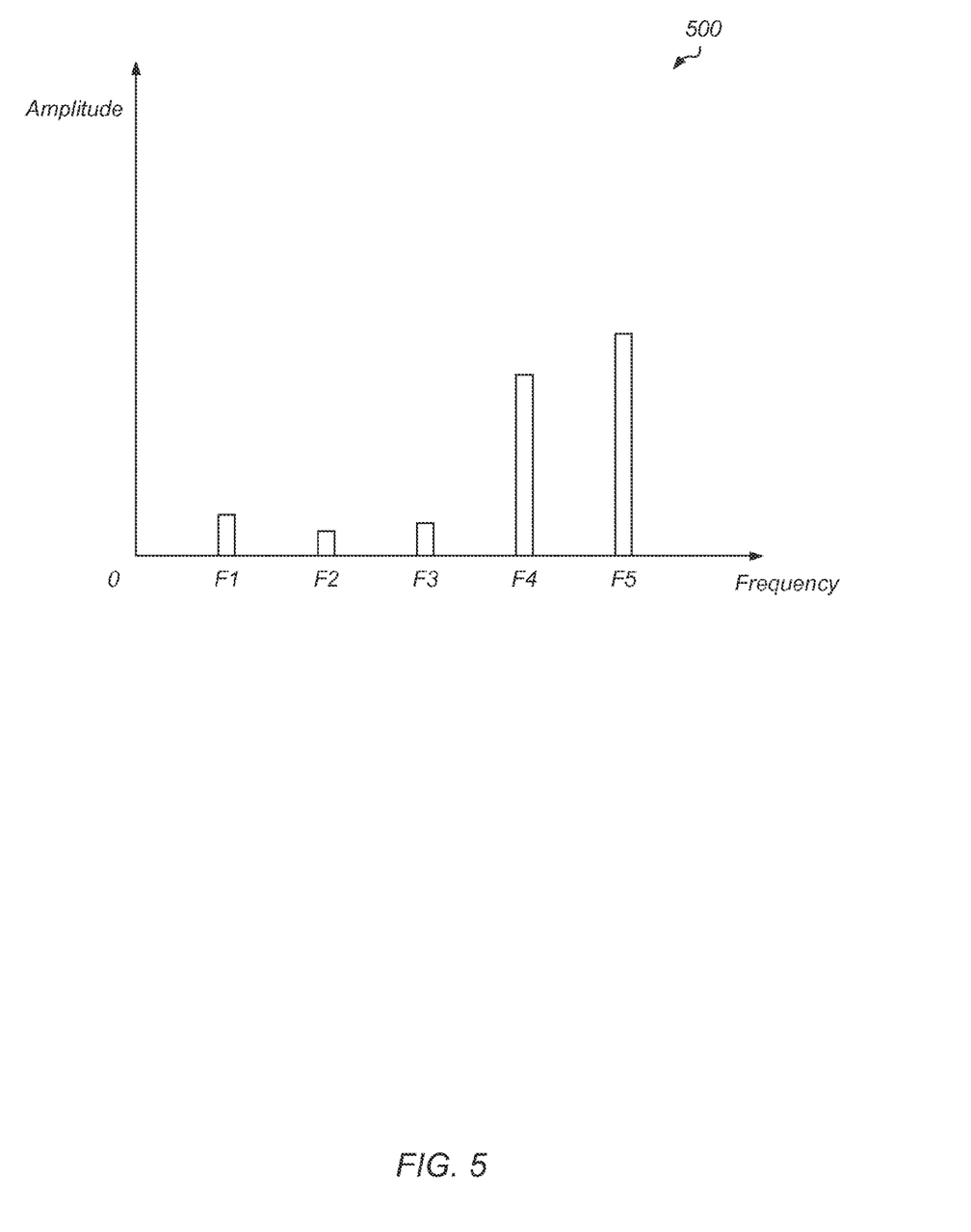
FIG. 5 illustrates one embodiment of a frequency domain representation of an I/O access listing.

Referring now to FIG. 5, one embodiment of a frequency domain representation of an I/O access listing is shown. It should be noted that frequency domain representation 500 is merely one example of a frequency domain representation after the addresses of a listing (e.g., listing 400 of FIG. 4) have been converted into the frequency domain. Other frequency domain representations may have a different distribution of frequency components depending on the types of access patterns used to generate the addresses of the corresponding listings. As shown, frequency domain representation 500 includes mostly high frequency components, which corresponds to a highly random access pattern for the addresses of the accesses in the corresponding listing.

In one embodiment, a series of frequency bins may be used to represent frequency domain representation 500. The frequency bins may divide the total signal spectrum into equally spaced frequency ranges, and the size of each bin may vary according to the embodiment. For example, in one embodiment, each frequency bin (F1, F2, etc.) shown on the horizontal axis may correspond to 1 kilohertz (kHz) of frequency range. The vertical axis may measure the amplitude of the energy in each frequency bin, and the amplitude may be measured using any suitable unit. It is noted that the term "energy" as used in this context is meant to indicate that standard techniques for analyzing and measuring a frequency domain representation may be utilized. However, the term "energy" is not intended to suggest that the original addresses contain energy in the same manner of an electrical signal undergoing a frequency domain transformation. The term "energy" may be defined as the numerical value of the frequency components in the frequency domain transformation.

Accordingly, the frequency component values in the frequency range from 0 to 1 kHz may be calculated and displayed above the frequency bin F1 in FIG. 5. The frequency component values in the frequency range from 1 kHz to 2 kHz is shown above frequency bin F2, the values in the frequency range from 2 kHz to 3 kHz is shown above frequency bin F3, and so on. It is noted that this is merely one example of a way to partition the total frequency range into bins for a particular spectral analysis. In other embodiments, other numbers of frequency bins may be utilized and the frequency bins may correspond to other sizes of frequency ranges. In a further embodiment, rather than combining the values of frequency components over a fixed range into a frequency bin, the frequency domain representation may be analyzed using the discrete frequency components generated by the transformation from the corresponding address listing. In other embodiments, frequency domain representation 500 may be analyzed using other suitable techniques. For example, components at a predetermined percentage or decibel level above the average signal level may be identified, a peak signal amplitude level may be located, and/or any other suitable spectral analysis may be used to identify the type of access pattern which generated spectrum 500.

A measure of randomness may be generated for frequency domain representation 500 based on a spectral analysis of the various frequency bins F1-F5. In one embodiment, the measure of randomness may then be compared to one or more thresholds to determine if the corresponding access pattern is a low random access pattern or high random access pattern. Metadata corresponding to a low random access pattern may be prioritized for retention in a cache while metadata corresponding to a high random access pattern may be evicted from the cache.

In one embodiment, an integral of the frequency components of representation 500 may be computed in order to measure an amount of randomness in the corresponding access pattern, with the integral giving more weight to higher frequency components. Thus, a frequency domain representation with mostly high frequency components will have a relatively high value when the integral is computed. Otherwise, a frequency domain representation with mostly low frequency components will have a relatively low value when the integral is computed. Accordingly, a frequency representation with mostly high frequency components may generate a high measure of randomness while a frequency representation with mostly low frequency components may generate a low measure of randomness. Frequency domain representations with values spread out evenly between high and low frequency components will generate a measure of randomness in the middle of the measurement range.

The measure of randomness may then be converted into a score which may then be assigned to the region of the logical address space corresponding to frequency domain representation 500. In one embodiment, a high measure of randomness may be converted to a low score while a low measure of randomness may be converted to a high score. Then, any metadata pages stored in the cache which correspond to a given region may be assigned the score which was generated for the given region. In other embodiments, the measures of randomness may be converted to scores using other techniques.

Figure 6:
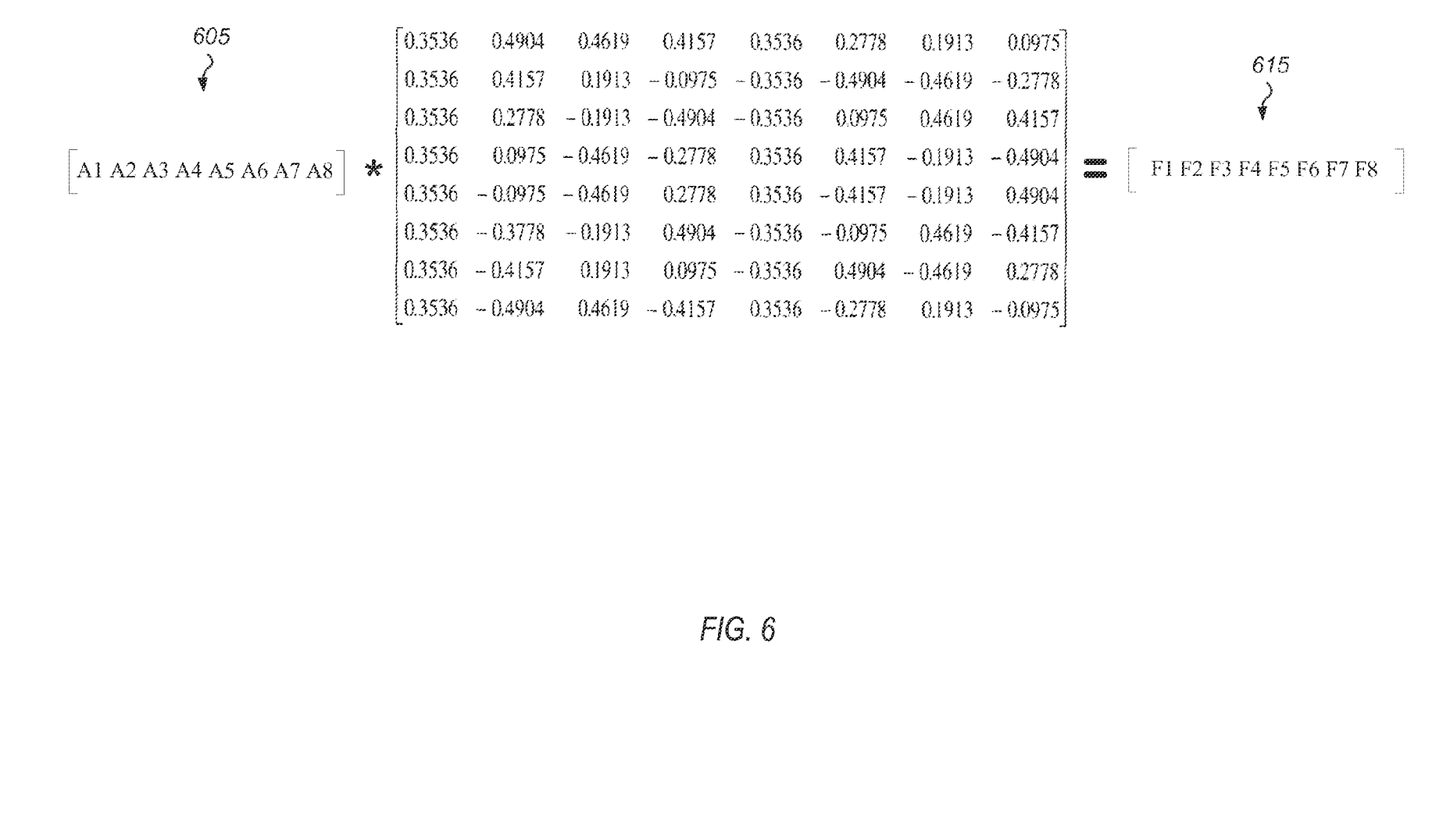
FIG. 6 illustrates one embodiment of converting addresses of I/O accesses into a frequency domain representation.

Turning now to FIG. 6, one embodiment of converting addresses of I/O accesses into a frequency domain representation is shown. The 1×8 matrix 605 includes eight addresses (A1-8) from captured I/O accesses. The eight addresses in matrix 605 may be converted into frequency domain representation 615 using 8×8 DCT matrix 610. Standard matrix multiplication may be utilized with the eight addresses (A1-A8) multiplied by the first column of matrix 610 to generate the value F1 of matrix 615, the eight addresses (A1-A8) multiplied by the second column of matrix 610 to generate the value F2, and so on.

Matrix 610 includes a zero frequency waveform in the leftmost column and the frequency increases in each column to the right with the highest frequency waveform shown in the rightmost column. Accordingly, frequency domain representation 615 includes eight frequency components (F1-F8), with F1 representing the lowest frequency and F8 representing the highest frequency. Frequency domain representation 615 may be analyzed to determine which frequency components have the highest values and to generate a corresponding randomness measure.

It is noted that the small number of addresses being converted into a frequency domain transformation in FIG. 6 are shown merely for the purposes of illustration. In a typical embodiment, the number of addresses which will be converted into a frequency domain representation will be much greater than eight. However, the eight addresses of matrix 605 shown in FIG. 6 are intended to serve as an example of how a larger number of addresses may be processed. Matrix 610 may be adjusted in size to accommodate a larger number of addresses that have been captured in other embodiments. For example, if one thousand addresses have been captured, then matrix 610 may have one thousand rows and eight columns. Additionally, matrix 610 may have more than eight columns in other embodiments, to increase the granularity of frequency components which can be detected in the addresses of matrix 605. For example, in other embodiments, matrix 610 may have 16 columns, 32 columns, 64 columns, or other numbers of columns. It is also noted that the values shown in matrix 610 are merely indicative of one embodiment. Other embodiments may utilize other values within matrix 610 without departing from the spirit of the methods and mechanisms disclosed herein. For example, other DCT matrices may be utilized with other values. Additionally, in other embodiments, other types of transforms besides the DCT may be utilized to generate a frequency domain representation from address matrix 605.

For example, although the values within matrix 610 are within the range from −1 to 1, in other embodiments, the values may be scaled by a factor into other ranges. Also, in some embodiments, a custom matrix may be utilized with custom waveforms in each column corresponding to the waveforms expected to be encountered in the access patterns being serviced by the storage system. Lower frequencies may be utilized in the leftmost columns of matrix 610 with the frequency increasing as the columns move to the right, but the frequencies may differ from the traditional DCT matrix scheme. For example, in another embodiment, the leftmost column of the multiplication matrix may have a positive frequency rather than having a frequency of zero as is shown in matrix 610. In a further embodiment, only low frequencies may be represented in the multiplication matrix, and the values in the resultant matrix may indicate the presence or absence of low frequencies, while omitting any check for high frequencies. Similarly, in a still further embodiment, only high frequencies may be represented in the multiplication matrix, and the values in the resultant matrix may indicate the presence or absence of high frequencies, while omitting any check for low frequency components. Variations on the above described techniques are possible and are contemplated.

Figure 7:
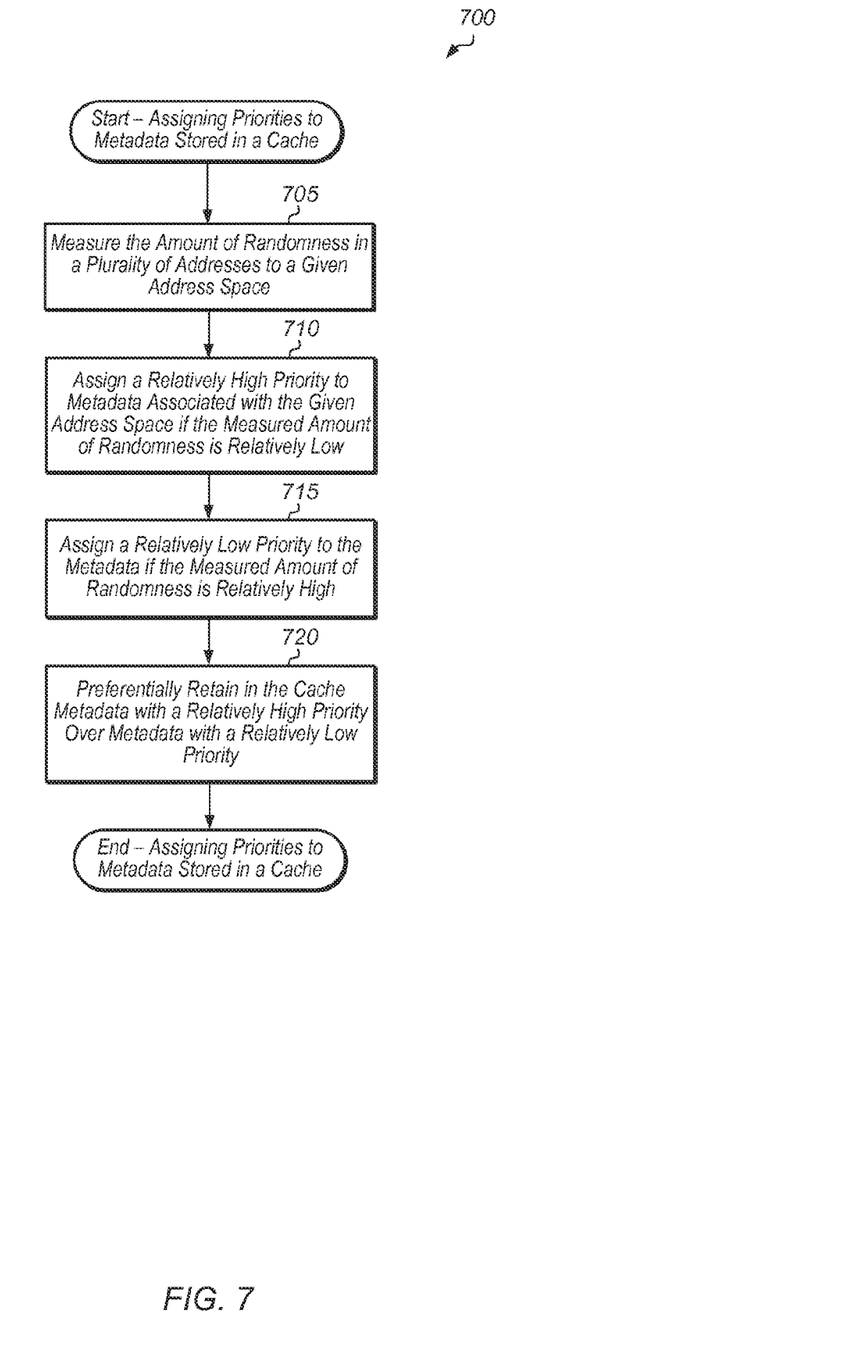
FIG. 7 is a generalized flow diagram illustrating one embodiment of a method for assigning priorities to metadata stored in a cache.

Referring now to FIG. 7, one embodiment of a method 700 for assigning priorities to metadata stored in a cache is shown. Any of the storage controllers, caches, and/or other control logic described throughout this specification may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

An amount of randomness may be measured in a plurality of accesses to a given address space (block 705). In one embodiment, a frequency domain representation of the addresses of the plurality of accesses may be generated. Then the components of the frequency domain representation may be analyzed to determine if the representation includes mostly high frequency components or mostly low frequency components. If the representation includes mostly high frequency components, then the amount of randomness may have a high value. If the representation includes mostly low frequency components, then the amount of randomness may be measured as having a low value. In other embodiments, other techniques for measuring the amount of randomness in a plurality of accesses to the given address space may be utilized. It is also noted that in one embodiment, the given address space may be an individual region of the total logical address space of a storage system.

A relatively high priority may be assigned to metadata associated with the given address space if the measured amount of randomness is relatively low (block 710). In one embodiment, the measured amount of randomness may be considered relatively low if the measured amount is less than a first threshold. A relatively low priority may be assigned to the metadata if the measured amount of randomness is relatively high (block 715). In one embodiment, the measured amount of randomness may be considered relatively high if the measured amount is greater than a second threshold. In one embodiment, the metadata may be assigned a score based on the assigned priority, and the score may be stored in the cache alongside the metadata.

Metadata with a relatively high priority may be preferentially retained in the cache over metadata with a relatively low priority (block 720). In one embodiment, the cache may utilize a cache replacement algorithm which bases eviction decisions on a variety of factors. For example, in one embodiment, the cache may utilize a least recently used (LRU) algorithm to select a first metadata page to be considered for eviction. After selecting the first metadata page, the cache may check the priority assigned to the metadata page based on the measured amount of randomness. If the selected metadata page has a relatively high priority, then the cache may retain the first metadata page and utilize the LRU algorithm to select a second metadata page to be considered for eviction. The cache may continue selecting metadata pages using the LRU algorithm until a metadata page with a relatively low priority is found. In other embodiments, the cache may utilize other techniques for determining which metadata pages to evict, with these other techniques based at least in part on the priorities assigned in blocks 710 and 715 of method 700. For example, in another embodiment, multiple factors may be combined to generate a total score for each metadata page, with a LRU factor generating a first score, with a randomness measure generating a second score, and so on, with a plurality of scores used to generate the total score. In some cases, a scaling factor may be applied to each score to scale the individual scores according to a particular formula when generating the total score. Other techniques for using the assigned priority as part of a cache replacement algorithm are possible and are contemplated.

It is noted that method 700 may be performed at various times by a storage controller, processor, cache, and/or other control logic. In some embodiments, method 700 may be performed on a fixed schedule. However, in other embodiments, one or more events may trigger method 700. These events may include detecting cache thrashing, determining there are processing resources available, determining the traffic being handled by the storage controller is below a threshold, and/or various other events.

Figure 8:
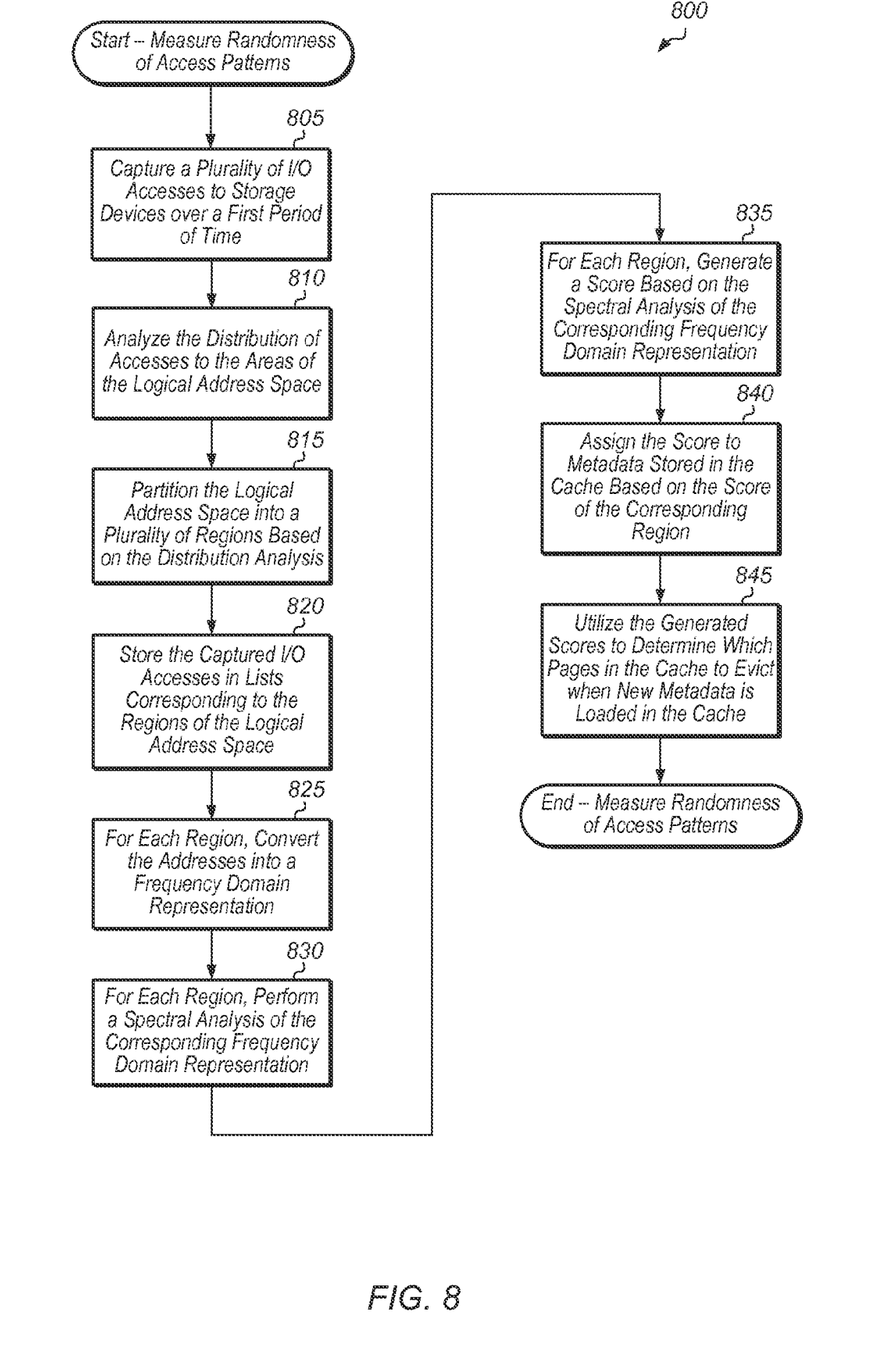
FIG. 8 is a generalized flow diagram illustrating one embodiment of a method for measuring the randomness of access patterns to regions of a logical address space.

Referring now to FIG. 8, one embodiment of a method 800 for measuring the randomness of access patterns to regions of a logical address space is shown. Any of the storage controllers, caches, and/or other control logic described throughout this specification may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A plurality of I/O accesses to one or more storage devices of a storage system may be captured over a first period of time (block 805). The capturing of the I/O accesses includes storing the logical address of each access. Additional information associated with each I/O access may also be stored in some embodiments. The length of the first period of time may vary depending on the embodiment. Next, the distribution of the accesses to areas within the total logical address space may be analyzed to determine which areas of the logical address space have the highest numbers of accesses (block 810). Then, the total logical address space may be partitioned into a plurality of regions based on the distribution analysis (block 815). In one embodiment, areas with large numbers of I/O accesses may be partitioned into smaller sized regions than areas with small numbers of I/O accesses. Alternatively, the logical address space may be partitioned using a predetermined partitioning pattern, and this partitioning may be performed prior to block 805. For example, in one embodiment, the logical address space may be partitioned into equal, 100 GB sized regions. Other sizes of regions may be utilized in other embodiments.

Next, the captured I/O accesses may be stored in lists which correspond to the regions of the logical address space (block 820). For example, in one embodiment, the logical address space may be partitioned into ten regions, and there may be a list for each of the ten regions. Each I/O access may be stored in the list which corresponds to the region in which the address of the I/O access belongs. Alternatively, rather than storing the I/O accesses in separate lists, only a single list may be maintained, but each I/O access within the list may be tagged with an region identifier (ID) which identifies which region the address of the I/O access falls within.

Next, for each region of the logical address space, the addresses of the I/O accesses may be converted into a frequency domain representation (block 825). In one embodiment, the conversion into the frequency domain representation may be performed using a Fourier-related transform. For example, in one embodiment, a FFT may be performed on the addresses of the I/O accesses of each region of the logical address space. In some cases, the number of addresses may not equal a power of two, and so the addresses may be padded with zeroes so that the total number of addresses and zeroes equals a power of two in order to improve the efficiency associated with implementing a FFT. In other embodiments, other types of transforms may be used to convert the addresses into a frequency domain representation.

Next, for each region, perform a spectral analysis of the corresponding frequency domain representation (block 830). The spectral analysis may be performed using any suitable technique. For example, the spectral analysis may involve determining if the corresponding frequency domain representation comprises mostly high frequency components or mostly low frequency components based on the frequency distribution of the frequency domain representation. Accordingly, the total spectral power below a first cutoff frequency may be calculated and compared to a first threshold, and the total spectral power above a second cutoff frequency may be calculated and compared to a second threshold. In another embodiment, the peak amplitude within the frequency domain representation may be identified and used to characterize the corresponding region.

Next, for each region, a score may be generated based on the spectral analysis of the corresponding frequency domain representation (block 835). In one embodiment, high scores may be given to frequency domain representations with mostly low frequency components and low scores may be given to frequency domain representations with mostly high frequency components. In other embodiments, other techniques for generating a score for a region may be utilized. Then, the score may be assigned to metadata stored in the cache based on the score of the region to which the metadata corresponds (block 840). The cache replacement algorithm may utilize the generated scores to determine which pages in the cache to replace when new metadata is loaded in the cache (block 845). The cache replacement algorithm may attempt to evict first metadata corresponding to one or more first workloads exhibiting high random access patterns while retaining second metadata corresponding to one or more second workloads exhibiting low random access patterns.

It is noted that method 800 may be performed at various times by a storage controller, processor, cache, and/or other control logic. In some embodiments, method 800 may be performed on a fixed schedule. However, in other embodiments, one or more events may trigger method 800.

Figure 9:
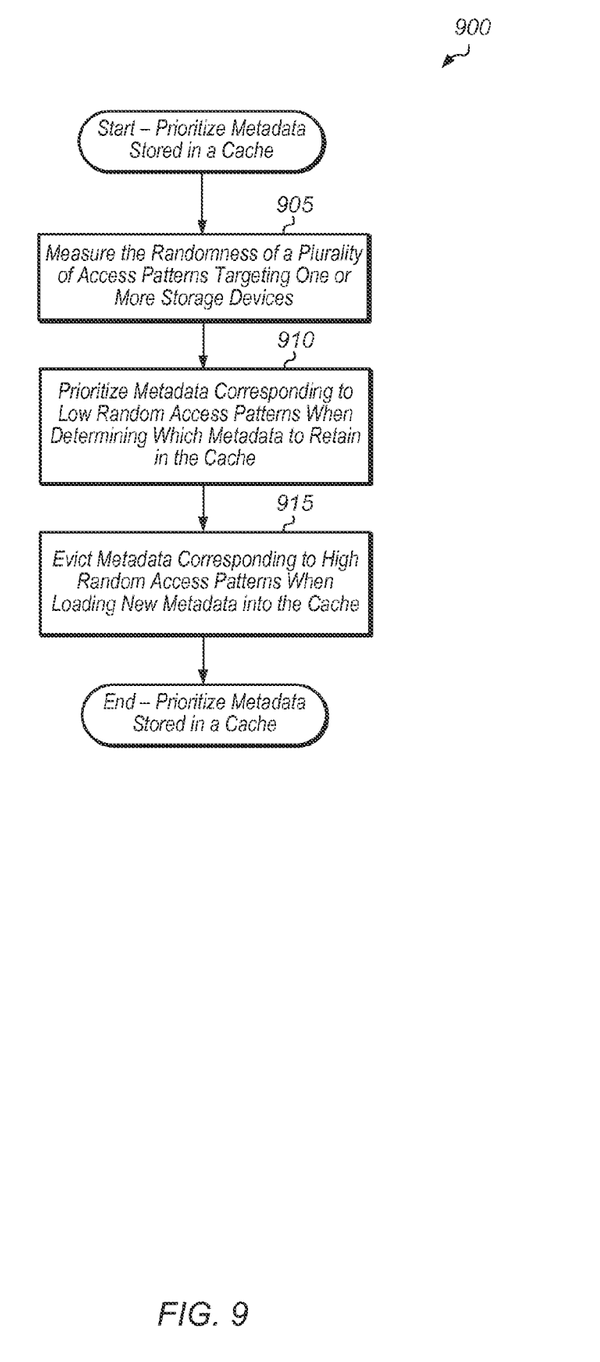
FIG. 9 is a generalized flow diagram illustrating one embodiment of a method for prioritizing metadata stored in a cache.

Turning now to FIG. 9, one embodiment of a method 900 for prioritizing metadata stored in a cache is shown. Any of the storage controllers, caches, and/or other control logic described throughout this specification may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

The randomness of each access pattern of a plurality of access patterns targeting one or more storage devices may be measured (block 905). In one embodiment, the randomness of an access pattern may be measured by capturing a plurality of addresses of a plurality of accesses and then generating a frequency domain representation of the plurality of addresses. Then, a spectral analysis of the frequency domain representation may be performed to determine the randomness of the access pattern. If the spectral analysis determines there are mostly low frequency components in the frequency domain representation, then the access pattern may be identified as a low random access pattern. If the spectral analysis identifies mostly high frequency components in the frequency domain representation, then the access pattern may be identified as high random access pattern. In other embodiments, other techniques for measuring the randomness of the access patterns may be utilized.

Next, metadata corresponding to low random access patterns may be prioritized when determining which metadata to retain in a cache (block 910). For example, in one embodiment, a first workload may be accessing a database. If a query is run on the database, there may be a pattern of accesses at fixed intervals to the database table. Accordingly, the first workload may be identified as a low random access pattern during the spectral analysis of its frequency domain representation, and then metadata corresponding to the first workload may be retained in the cache. Additionally, metadata corresponding to high random access patterns may be evicted from the cache when new metadata is loaded into the cache (block 915).

It is noted that method 900 may be performed at various times by a storage controller, processor, cache, and/or other control logic. In some embodiments, method 900 may be performed on a fixed schedule. However, in other embodiments, one or more events may trigger method 900.

It is noted that the above-described embodiments may comprise software. In such an embodiment, the program instructions that implement the methods and/or mechanisms may be conveyed or stored on a non-transitory computer readable medium. Numerous types of non-transitory media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

It should be emphasized that the above-described embodiments are only non-limiting examples of implementations.

Numerous variations and modifications will become apparent to those skilled in the art once the above disclosure is fully appreciated. It is intended that the following claims be interpreted to embrace all such variations and modifications.

What is claimed is:

1. A method comprising:
   measuring an amount of randomness in a plurality of accesses to a given address space;
   assigning a relatively high priority to metadata associated with the given address space if the measured amount of randomness is relatively low;
   assigning a relatively low priority to the metadata if the measured amount of randomness is relatively high; and
   wherein metadata with a relatively high priority is preferentially retained in a cache over metadata with a relatively low priority.

2. The method as recited in claim 1, wherein measuring said amount of randomness comprises generating a frequency domain representation of a plurality of addresses of the plurality of accesses.

3. The method as recited in claim 1, wherein the plurality of accesses target a logical address space.

4. The method as recited in claim 3, wherein measuring said amount of randomness comprises:
   capturing a plurality of addresses from the plurality of accesses;
   generating a first frequency domain representation of a first plurality of addresses from the captured plurality of addresses, wherein the first plurality of addresses correspond to a first region of the logical address space, and wherein the first frequency domain representation has a first frequency distribution;
   measuring an amount of randomness in the first frequency distribution by adding together frequency component values above a first cutoff frequency in the first frequency distribution;
   identifying the first region as a relatively low random region responsive to determining the frequency component values above the first cutoff frequency are less than a first threshold; and
   identifying the first region as a relatively high random region responsive to determining the frequency component values above the first cutoff frequency are greater than a first threshold.

5. The method as recited in claim 4, further comprising:
   generating a first score corresponding to the first region, wherein the first score is based on the amount of randomness in the first frequency distribution;
   identifying one or more pages of first metadata corresponding to the first region which are stored in the cache;
   assigning the first score to each of the one or more pages of first metadata which are stored in the cache; and
   utilizing the first score when determining whether to evict the one or more pages of first metadata from the cache.

6. The method as recited in claim 4, further comprising partitioning the logical address space into a plurality of regions.

7. The method as recited in claim 6, further comprising generating a second frequency domain representation of a second plurality of addresses from the captured plurality of addresses, wherein the second plurality of addresses correspond to a second region of the logical address space, and wherein the second frequency domain representation has a second frequency distribution.

8. A system comprising:
   one or more storage devices;
   a cache, wherein the cache is configured to store metadata; and
   a storage controller;
   wherein the storage controller is configured to:
      measure an amount of randomness in a plurality of accesses to a given address space;
      assign a relatively high priority to metadata associated with the given address space if the measured amount of randomness is relatively low;
      assign a relatively low priority to the metadata if the measured amount of randomness is relatively high; and
   wherein metadata with a relatively high priority is preferentially retained in the cache over metadata with a relatively low priority.

9. The system as recited in claim 8, wherein measuring said amount of randomness comprises generating a frequency domain representation of a plurality of addresses of the plurality of accesses.

10. The system as recited in claim 8, wherein the plurality of accesses target a logical address space.

11. The system as recited in claim 10, wherein measuring said amount of randomness comprises:
    capturing a plurality of addresses from the plurality of accesses;
    generating a first frequency domain representation of a first plurality of addresses from the captured plurality of addresses, wherein the first plurality of addresses correspond to a first region of the logical address space, and wherein the first frequency domain representation has a first frequency distribution;
    measuring an amount of randomness in the first frequency distribution by adding together frequency component values above a first cutoff frequency in the first frequency distribution;
    identifying the first region as a relatively low random region responsive to determining the frequency component values above the first cutoff frequency are less than a first threshold; and
    identifying the first region as a relatively high random region responsive to determining the frequency component values above the first cutoff frequency are greater than a first threshold.

12. The system as recited in claim 11, wherein the storage controller is further configured to generate a first score corresponding to the first region, wherein the first score is based on the amount of randomness in the first frequency distribution, and wherein the cache is further configured to:
    identify one or more pages of first metadata corresponding to the first region which are stored in the cache;
    assign the first score to each of the one or more pages of first metadata which are stored in the cache; and
    utilize the first score when determining whether to evict the one or more pages of first metadata from the cache.

13. The system as recited in claim 11, wherein the storage controller is further configured to partition the logical address space into a plurality of regions.

14. The system as recited in claim 13, wherein the storage controller is further configured to generate a second frequency domain representation of a second plurality of addresses from the captured plurality of addresses, wherein the second plurality of addresses correspond to a second region of the logical address space, and wherein the second frequency domain representation has a second frequency distribution.

15. A non-transitory computer readable storage medium storing program instructions, wherein the program instructions are executable by a processor to:
- measure an amount of randomness in a plurality of accesses to a given address space;
- assign a relatively high priority to metadata associated with the given address space if the measured amount of randomness is relatively low;
- assign a relatively low priority to the metadata if the measured amount of randomness is relatively high; and
- wherein metadata with a relatively high priority is preferentially retained in a cache over metadata with a relatively low priority.

16. The non-transitory computer readable storage medium as recited in claim 15, wherein measuring said amount of randomness comprises generating a frequency domain representation of a plurality of addresses of the plurality of accesses.

17. The non-transitory computer readable storage medium as recited in claim 15, wherein the plurality of accesses target a logical address space.

18. The non-transitory computer readable storage medium as recited in claim 17, wherein measuring said amount of randomness comprises:
- capturing a plurality of addresses from the plurality of accesses;
- generating a first frequency domain representation of a first plurality of addresses from the captured plurality of addresses, wherein the first plurality of addresses correspond to a first region of the logical address space, and wherein the first frequency domain representation has a first frequency distribution;
- measuring an amount of randomness in the first frequency distribution by adding together frequency component values above a first cutoff frequency in the first frequency distribution;
- identifying the first region as a relatively low random region responsive to determining the frequency component values above the first cutoff frequency are less than a first threshold; and
- identifying the first region as a relatively high random region responsive to determining the frequency component values above the first cutoff frequency are greater than a first threshold.

19. The non-transitory computer readable storage medium as recited in claim 18, wherein the program instructions are further executable by a processor to:
- generate a first score corresponding to the first region, wherein the first score is based on the amount of randomness in the first frequency distribution;
- identify one or more pages of first metadata corresponding to the first region which are stored in the cache;
- assign the first score to each of the one or more pages of first metadata which are stored in the cache; and
- utilize the first score when determining whether to evict the one or more pages of first metadata from the cache.

20. The non-transitory computer readable storage medium as recited in claim 18, wherein the program instructions are further executable by a processor to partition the logical address space into a plurality of regions.

* * * * *